UNITED STATES PATENT OFFICE.

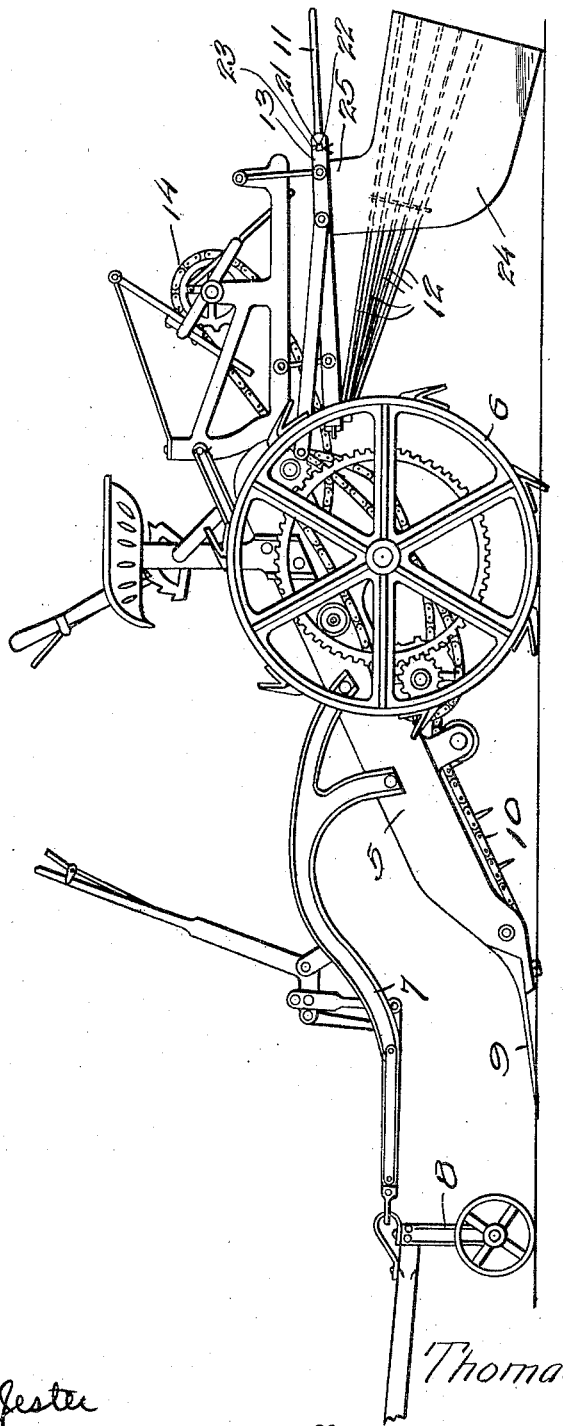

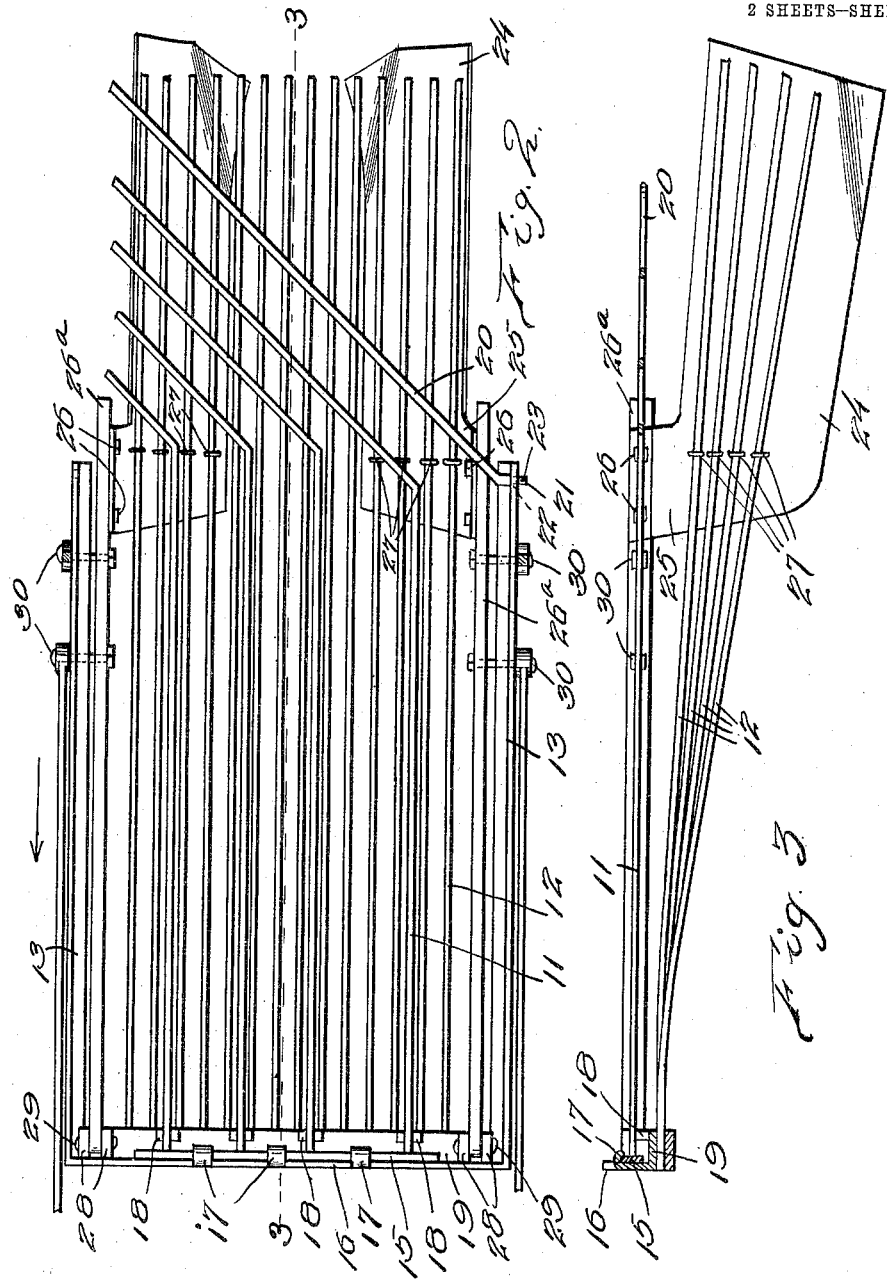

THOMAS E. HALE, OF CARIBOU, MAINE.

POTATO-DIGGER.

1,078,435.  Specification of Letters Patent.  Patented Nov. 11, 1913.

Application filed October 26, 1912. Serial No. 728,015.

*To all whom it may concern:*

Be it known that I, THOMAS E. HALE, a citizen of the United States, residing at Caribou, in the county of Aroostook and State of Maine, have invented certain new and useful Improvements in Potato-Diggers, of which the following is a specification.

My invention relates to new and useful improvements in potato diggers and has particular reference to discharge means for the tops of the potatoes and the potatoes, which discharge means are particularly well adapted to be used in connection with the potato digger shown in Patent No. 382,363 and commonly known as the Hoover potato digger.

The potato digger shown in Patent No. 382,363, and commonly known as the Hoover potato digger, is now extensively manufactured in the United States with comparatively few changes. The principal disadvantage heretofore encountered in the use of this machine is that the curved tines would discharge the potato tops upon the opposite sides of the alternate rows, it being well known that potatoes are ordinarily planted in suitably spaced parallel rows. The potato tops would thus be thrown into the next row which had not been dug.
Owing to this disadvantage in the operation of the machine, it is customary to dig every other row of the potatoes by hand, subsequent to which the Hoover potato digger may be employed to dig the other rows, as the tops will now be conducted into the rows which have been dug by hand. It has also been found that the lower set of tines which conduct the potatoes away from the machine, become bent or displaced, thus depositing the potatoes in an improper manner, forming a too wide row of the same.

My invention aims to overcome the first named disadvantage encountered in connection with the use of the Hoover potato digger, by providing novel means for detachably connecting the curved potato top tines with the machine, whereby their curved or laterally extending ends may be made to extend in opposite directions with relation to the machine, to always discharge the potato tops in the same direction irrespective of the direction in which the machine is traveling. In other words, when the machine is traveling up one row the curved tines will discharge the potato tops to the right and when the machine is traveling down the next row the potato tops will be discharged to the left. It is thus seen that the potato tops are not discharged upon the next undug potato row preceding, but always into the last dug row. In this manner the necessity of digging every other row of the potatoes by hand is dispensed with, thus economizing in time and labor.

My invention further aims to overcome the second disadvantage in the operation of the Hoover potato digger by providing novel and simple means to be used in connection with the lower set of tines whereby the potatoes are finally discharged in a narrow row, thus enabling them to be more quickly and easily collected.

An important object of this invention is to provide means of the above mentioned character, which may be installed upon the Hoover potato digger without materially altering its construction.

A further object of this invention is to provide means of the above mentioned character, which are simple in construction, cheap to manufacture, easy to operate, strong and durable.

Other objects and advantages of this invention will be apparent during the course of the following description.

In the accompanying drawings forming a part of this specification and in which like numerals are employed to designate like parts throughout the same, Figure 1 is a side view of the Hoover potato digger having my improvements applied thereto, Fig. 2 is a plan view of my improvements, showing the same applied to the vibratory frame of the Hoover potato digger, and, Fig. 3 is a longitudinal sectional view taken on line 3—3 of Fig. 2.

In the drawings, wherein for the purpose of illustration I have shown a preferred embodiment of my invention, the numeral 5 designates the body portion of the Hoover potato digger, which is mounted upon wheels 6. Connected with this body portion is a plow beam 7, which is connected with a draft appliance 8, as shown. Connected with the lower end of the body portion 5 is a plow shear or digger 9. Operating within the body portion 5 is an endless conveyer or elevator 10. This elevator conducts the potatoes, tops and earth upwardly and discharges the same upon the upper set of potato top tines 11. Disposed below the potato top tines 11 is a second set of tines 12, which may be termed the potato tines. Both sets of tines are mounted upon a vibratory frame 13. Suitable means are provided to drive the endless conveyer or elevator 10 and vibrate the frame 13.

The numeral 14 designates mechanism to rake or feed the potato tops longitudinally of the tines 11, toward the discharge end of the tines.

Since no claim is made to the general construction of the potato digger, the same being clearly disclosed in Patent No. 382,363, it is thought that the above description will suffice for the purpose of showing a clear application of the present invention.

The potato top tines 11 have their rear or free ends bent or extending laterally, to conduct the potato tops to one side of the machine. The inner ends of the tines 11 are preferably permanently and rigidly connected with a detachable securing bar 15, as shown. The transverse portion 16 of the vibratory frame 13, is slit or cut at spaced intervals, for providing downwardly bent securing tongues 17. The transverse and longitudinal portions of the vibratory frame 13 are formed L-shaped in cross-section, as shown. Rigidly mounted upon the transverse portion 16 rearwardly of the securing tongues 17 are upstanding lugs or blocks 18, provided upon their upper ends with grooves or recesses to receive the tines 11, as shown. When the bar 15 is placed within or beneath the tongues 17 and the tines 11 inserted within the recesses formed upon blocks 18, such tines will then occupy their horizontal or operative position, and will remain in such position, the bar 15 being held suitably spaced from the horizontal part 19 of the transverse portion 16. It is thus seen that by swinging the free ends of the tines 11 upwardly, the bar 15 may be completely disconnected from the transverse portion 16, attention being called to the fact that lugs or blocks 18 are sufficiently spaced from the bar 15 when the same is being held in place by the tongues 17 to permit of the easy removal of the bar 15. It is thus seen that the potato top tines 11 may be connected with the vibratory frame 13 with their free ends extending laterally toward one side of the machine, and may be easily and quickly detached from the vibratory frame so that the same may be again connected therewith after the same have been inverted or reversed so that their outer or bent portions will extend toward the opposite side of the machine.

The numeral 20 designates an auxiliary potato top tine, which is ordinarily employed in connection with the tines 11. This tine may be detachably connected with the end of either of the longitudinal portions of the frame 13. The tine 20 extends diagonally of the machine and is parallel with the laterally extending ends of the tines 11. Any suitable form of detachable connecting means may be employed to secure the tine 20 to the free end of either of the longitudinal portions of the frame 13. An example of this detachable connecting means is to have the tine 20 provided at its inner end with an extension 21, which is square in cross section, and adapted for insertion through openings 22 formed through the free ends of the longitudinal portions of the frame 13. This extension 21 is provided with a transverse opening to receive a cotter pin 23 or the like. It is thus seen that when the tines 11 are reversed so that their laterally extending ends will extend toward the opposite side of the machine, the tine 20 may also be reversed to remain in coöperative relation to the tines 11.

My second improvement consists in the provision of guide-shields 24, which are preferably formed of suitably stiff sheet metal. These guide-shields are provided at their inner ends with upper extensions 25, which are securely connected with the free ends of longitudinally extending bars or elements 26$^a$ by bolts 26 or the like. The guide-shields 24 are connected with the outer tines 12 in the lower set by eye bolts 27 or the like. It is thus seen that these guide-shields serve to prevent the outer tines 12 from being bent, spread or displaced whereby they will deliver the potatoes upon the ground in a narrow row. The guide-shields 24 extend for a considerable distance beyond the tines 12, and have the lower portions of their material adjacent their free ends bent inwardly sufficiently, to deflect the potatoes inwardly as they drop from the tines 12, thus causing the potatoes to be disposed on the ground in a suitably narrow row. The tines 12 are rigidly connected at their inner ends with the transverse portion 16 by suitable means. The longitudinally extending bars 26$^a$ are connected with the transverse portion 16 of the frame 13 outwardly of the bar 15, the same being preferably inserted between extensions or lugs 28, cast upon the transverse portion 16, and provided with openings for receiving bolts 29, which also pass through the ends of the longitudinal bars 26$^a$. Bolts 30 also serve to connect the outer ends of the longitudinal bars 26$^a$ with the side portions of the frame 13, as shown.

The operation of the device is as follows: It being assumed that the potato field is to be dug by starting with the first right-hand row, the potato top tines will be arranged as shown in Fig. 2, the same having their bent or laterally extending ends extending to the right. When the machine is driven up the row, as indicated by the arrow in Fig. 2, the potato tops will be conducted by the potato top tines 11 and 20 to the right side of the machine and discharged a suitable distance to the right of the potato row which is now being dug. When the machine reaches the end of this first row the same is turned around and driven down the next row. It is obvious that if the potato top tines 11 and 20 were not now reversed so that their free ends would extend toward the opposite side of the machine such potato top tines would now discharge the potato tops upon the next row to the right of the machine, which has not been dug. By reversing the potato top tines so that their free ends extend laterally toward the opposite side of the machine, the potato tops will be conducted to the left and will be discharged into the potato row to the left which has already been dug. The guide-shields 24 serve to aid the tines 12 in depositing the potatoes in a narrow row, it being understood that the earth is free to pass between the tines 12.

It is to be understood that the form of my invention herewith shown and described, is to be taken as a preferred example of the same and that certain changes in the shape, size, and arrangement of parts may be resorted to without departing from the spirit of my invention or the scope of the subjoined claims.

Having fully described my invention, I claim:—

1. The combination with a potato digger including a frame, of a plurality of potato top tines having laterally extending end portions, a common support to which the tines are secured, and means detachably connecting the common support with the frame.

2. The combination with a potato digger comprising a frame, of a plurality of potato top tines provided with laterally extending end portions, a transverse bar attached to the opposite ends of the tines, and securing elements connected with the frame to detachably hold the transverse bar in place upon the frame.

3. The combination with the frame of a potato digger, of a plurality of potato top tines provided with laterally extending end portions, a transverse bar connected with the opposite ends of the potato top tines, downwardly bent tongues connected with the frame and adapted to receive the transverse bar therebelow, and upstanding blocks connected with the frame and provided with recesses to receive the tines, whereby the tines are securely held in place upon the frame and may be detached therefrom, for the purpose specified.

4. The combination with a transverse bar, of a plurality of potato top tines secured thereto and provided with laterally extending portions, and readily detachable means to connect the transverse bar with the machine upon which the tines are mounted, whereby the tines may be reversed so that their laterally extending end portions will deliver the tops to opposite sides of the machine.

5. The combination with the frame of a potato digger, of a transverse bar, a plurality of tines provided with laterally extending end portions and connected at their opposite ends with the transverse bar, means for detachably connecting the transverse bar with the transverse portion of the frame, a potato top tine to coöperate with the first named tines, and means whereby the potato top tine may be detachably connected with either of the longitudinal portions of the frame.

6. The combination with a potato digger including a frame, of a plurality of potato top tines having laterally extending portions normally extending toward one side of said frame and disposed near the trailing end of the frame, and means whereby said potato top tines may be simultaneously shifted so that their laterally extending portions will extend toward the opposite side of said frame.

7. The combination with a potato digger including a frame, of a plurality of potato top tines disposed near the trailing end of the frame and having laterally extending portions extending toward one side of the frame, and means whereby said potato top tines are connected with the frame and may be readily turned upon their longitudinal axis so that their laterally extending portion will extend toward the opposite side of the frame.

8. The combination with a potato digger including a frame, of apparatus connected with the trailing end of the frame for guiding the potato tops to one side of the frame, and means whereby said apparatus may be readily operated so that it will guide the potato tops to the opposite side of the frame.

9. The combination with a potato digger including a frame, of a plurality of potato top tines connected with the trailing end thereof and provided with laterally extending portions extending toward one side of the frame, and means whereby said laterally extending portions may be readily moved to extend toward the opposite side of the frame.

In testimony whereof I affix my signature in presence of two witnesses.

THOMAS E. HALE.

Witnesses:
W. P. HAMILTON,
ESTELLE W. BROOKS.

Copies of this patent may be obtained for five cents each, by addressing the "Commissioner of Patents, Washington, D. C."